UNITED STATES PATENT OFFICE.

DAVID J. OGILVY, OF CINCINNATI, OHIO.

BINDER FOR CORE-MAKING.

13,559. Specification of Reissued Letters Patent. Reissued Apr. 29, 1913.

No Drawing. Original No. 1,054,933, dated March 4, 1913, Serial No. 316,008. Application for reissue filed March 13, 1913. Serial No. 754,163.

*To all whom it may concern:*

Be it known that I, DAVID J. OGILVY, a citizen of the United States, residing at the city of Cincinnati, in the county of Hamilton and State of Ohio, have invented certain new and useful Improvements in Binders for Core-Making, of which the following is a specification.

The object of this invention is to produce an economical and satisfactory core binding agent for use in foundry purposes. This object I attain by utilizing rosin pitch, which being usually a secondary or by product, is therefore low in price. This pitch may be used for core binding either in a solid or liquefied condition. When it is used in a solid state it is preferable to have a pitch which is brittle and which may be easily powdered, and which will remain in a powdered condition under ordinary weather conditions. A hard pitch suitable for grinding if not at hand, may be produced from a soft rosin pitch, by removing a portion of the more volatile products by heat, thereby I easily obtain a pitch of the necessary hardness.

The method of applying rosin pitch to core making is similar to the means employed in applying ordinary rosin, the means of using rosin being well known to those skilled in the art of core making.

Among the many advantages of rosin pitch as a core binding agent are its low price, the ease with which the hard pitch may be powdered, and which may be kept in a powdered condition at ordinary temperatures. Rosin pitch has not the disagreeable and irritating effect that many other core-binding agents have. Cores in which rosin pitch is used as the binding agent are not deliquescent. By the term rosin pitch is understood the dark colored residues obtained by heating or distilling rosin or rosin mixtures, varying from a semifluid to a hard solid state depending on the temperature and duration of heating to which the rosin or rosin products have been exposed.

What I claim as new and of my invention and desire to secure by Letters Patent is:—

1. In a binder for core making, a composition of matter consisting of brittle rosin pitch and a material suitable for use in the making of cores, as set forth.

2. As a binder for core making, a composition of matter consisting of powdered brittle rosin pitch and a powdered material suitable for use in the making of cores, as set forth.

DAVID J. OGILVY.

Witnesses:
H. E. CARSTENS,
SAML. C. COX.